United States Patent [19]
Yamauchi et al.

[11] Patent Number: 5,066,087
[45] Date of Patent: Nov. 19, 1991

[54] OPTICAL FIBER COUPLER

[75] Inventors: Ryozo Yamauchi, Sakura; Noboru Kawakami, Chiba; Fumio Suzuki, Sanbu, all of Japan

[73] Assignee: Fujikura Ltd., Tokyo, Japan

[21] Appl. No.: 490,026

[22] Filed: Mar. 7, 1990

[51] Int. Cl.⁵ .............................................. G02B 6/26
[52] U.S. Cl. .......................................... 385/43; 385/50
[58] Field of Search ............... 350/96.33, 96.15, 96.29; 65/4.3, 2

[56] References Cited

U.S. PATENT DOCUMENTS

| 4,490,163 | 12/1984 | Jochem et al. | 65/4.21 |
| 4,755,037 | 7/1988 | Bjornlie et al. | 350/96.15 |
| 4,798,436 | 1/1989 | Mortimore | 350/96.15 |
| 4,801,185 | 1/1989 | Bricheno | 350/96.15 |

FOREIGN PATENT DOCUMENTS

| 0093460 | 11/1983 | European Pat. Off. |
| 2-108009 | 4/1990 | Japan . |
| 8700934 | 2/1987 | United Kingdom . |
| 2207254 | 1/1989 | United Kingdom . |

Primary Examiner—John D. Lee
Assistant Examiner—John Ngo
Attorney, Agent, or Firm—Sprung Horn Kramer & Woods

[57] ABSTRACT

The optical fiber coupler of the present invention is characterized in that, for a defined section in which two or more component optical fibers are thermally fused and elongated thereby forming a fused-elongated region which constitutes the optical fiber coupler, that at least one of the component optical fibers is formed from a single mode optical fiber material employed within a parameter range in which the mode field diameter increases monotonically with decrease in the diameter of the optical fiber core. The optical fiber coupler is further characterized in that, when using optical fibers from which a portion of the coating material has been removed thereby exposing the cladding, and by aligning two or more of such component optical fibers side by side in a plane and mutually thermally fusing the exposed cladding of adjacent optical fibers, after which the fused region is drawn out, thereby forming a fused-elongated region which constitutes the optical fiber coupler, for such an optical fiber coupler, optical fiber material is used in which the softening temperature of the core is higher than that of the cladding, and further, for the drawing out of the mutually fused sections, the tension employed is such that by virtue of remaining stress, the refractive index of the core is reduced.

10 Claims, 6 Drawing Sheets

OPTICAL FIBER COUPLER

BACKGROUND OF THE INVENTION

1. Field of the Invention

The present invention concerns optical fiber couplers employed in communication systems.

2. Prior Art

In one type of optical fiber coupler known in the art, two or more fibers are aligned side by side in a plane and thermally fused and elongated, thereby forming a fused-elongated region.

In the fused-elongated region thus formed, the diameter of each component optical fiber is reduced, as is the diameter of the core of each fiber. To the extent that diameter of the cores of the optical fibers are reduced, a proportionately larger fraction of the light propagated therein leaks through the cladding which surrounds the core of each fiber. Also, to the extent that the component optical fibers are drawn out and thereby elongated, the distance between the cores of adjacent optical fibers is reduced, and due to this fact, the coupling between the propagated modes of the individual fibers becomes extremely great. In this way, the light signal carried by one fiber branches and is thus caused to be multiplexed over two or more optical fibers.

However, the above described optical fiber coupling technique has the following shortcomings:

1. When conventional quartz glass single mode optical fiber is used to form the optical fiber coupler, because the properties of the material are such that very little light energy is lost through the lateral surface of the fiber, the fused-elongated region must be quite long in order to sufficiently achieve optical coupling. Further, in order to form a fused-elongated region of sufficient length, the resulting diameters of the component optical fibers in the fused-elongated region end up being considerably reduced. For example, starting with quartz optical fibers having an outer diameter of 125 $\mu$m, it is possible that in the fused-elongated region of the resulting coupler, the fibers have a final outer diameter of on the order of 20 $\mu$m. Because of this effect, even a relatively small curvature in the optical fiber results in light leaking through the side of the fiber to the exterior with loss in light energy. With a larger amount of bending in the optical fiber, the bending losses become significant.

2. When forming the fused-elongated region, if it is desired to limit the amount of elongation and still achieve the desired degree of optical coupling, the length of the fused region must be considerable. Thus even though the elongation of the optical fiber has been limited in such a case, the coupler ends up being quite long. Accordingly, in answer to applications calling for miniaturization, such an optical fiber coupler cannot be practically employed.

SUMMARY OF THE INVENTION

In answer to the above described difficulties, it is an object of the present invention to provide an optical fiber coupler that can be fabricated with ease and from which losses are minimal, and further, which can be employed in applications calling for miniaturization.

As the result of various experiments, it has been found that by employing a single mode optical fiber within a parameter range in which the mode field diameter increases monotonically with decrease in the diameter of the optical fiber core, that even when the amount of optical fiber elongation is limited, adequate optical coupling can be achieved. Furthermore, it has been found that by limiting the difference in refractive index between the cladding and the core in the fused-elongated region, that even though the core diameter has not been exceedingly reduced, adequate optical coupling can further be ensured.

Accordingly, the present invention provides an optical fiber coupler characterized in that, for a defined section in which two or more component optical fibers are thermally fused and elongated thereby forming a fused-elongated region which constitutes the optical fiber coupler, that at least one of the component optical fibers is formed from a single mode optical fiber material employed within a parameter range in which the mode field diameter increases monotonically with decrease in the diameter of the optical fiber core. By virtue of this feature, the amount of elongation or drawing of each component fiber which is carried out after fusing the fibers can be limited while still achieving adequate optical coupling, thereby making it possible to create miniaturized optical fiber couplers by this technique.

The optical fiber coupler provided by the present invention is further characterized in that, when using optical fibers from which a portion of the coating material has been removed thereby exposing the cladding, and by aligning two or more of such component optical fibers side by side in a plane and mutually thermally fusing the exposed cladding of adjacent optical fibers, after which the fused region is drawn out, thereby forming a fused-elongated region which constitutes the optical fiber coupler, for such an optical fiber coupler, optical fiber material is used in which the softening temperature of the core is higher than that of the cladding, and further, for the drawing out of the mutually fused sections, the tension employed is such that by virtue of remaining stress, the refractive index of the core is reduced. By so forming the optical fiber coupler, it is possible to reduce the difference in refractive index between the core and the cladding, widen the mode power distribution, and thereby achieve optical coupling between adjacent optical fibers. Furthermore, because the amount of elongation or drawing of the fibers which is carried out after fusing the fibers need not be extreme while still achieving adequate optical coupling, it is thereby possible to improve the mechanical strength of the fused-elongated region. Moreover, because the amount of drawing of the component fibers after fusing and hence reduction in the diameters of their respective cores is limited, it possible to create optical fiber couplers with low optical losses. By limiting the formation of curvature in the couplers, losses can be further lessened.

DETAILED DESCRIPTION OF THE PREFERRED EMBODIMENTS

First Preferred Embodiment

In the following section, the first preferred embodiment of the present invention will be described with reference to FIGS. 1 and 2.

Figure 1:
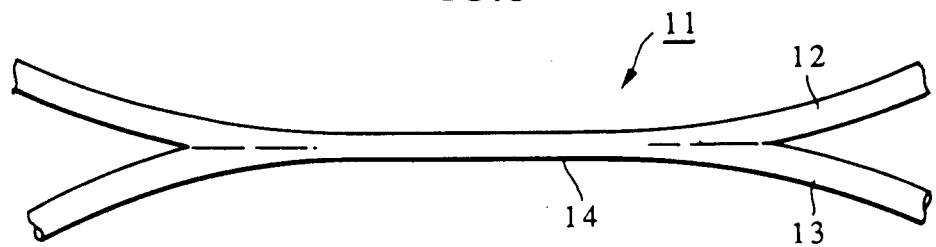
FIG. 1 is a side view of the optical fiber coupler of the first preferred embodiment of the present invention.

The optical fiber coupler 11 of the present embodiment as shown in FIG. 1 consists of a fused-elongated region 14 formed by thermally fusing and then drawing out a section of each of two component optical fibers 12 and 13, one of which is an conventional quartz single mode optical fiber 12 (hereafter referred to as conventional fiber), and one of which is a single mode optical fiber 13 characterized by having a parameter range in which the mode field diameter increases monotonically with decrease in the diameter of the optical fiber core. For the single mode optical fiber 13, it is preferable to use quartz single mode optical fiber of which the extent of its mode (mode field diameter) rapidly increases with decrease in the diameter of its core, and hence, with drawing out of the fiber.

Figure 2:
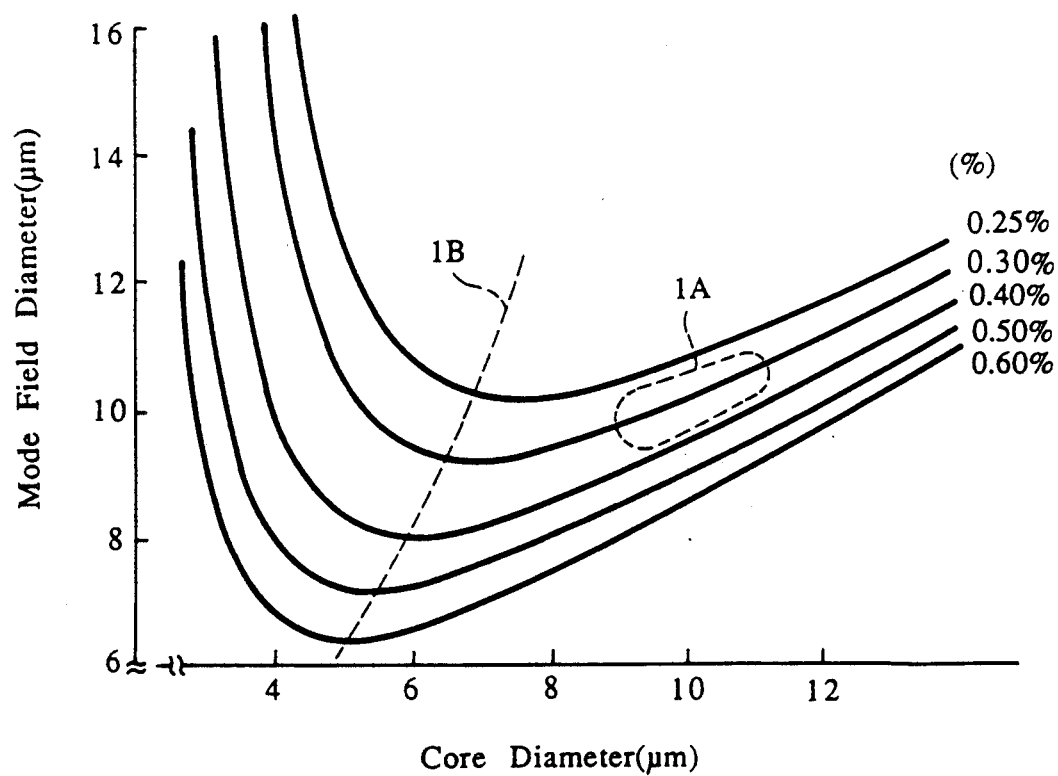
FIG. 2 is a graph illustrating the relationship between core diameter and diameter of the mode field for a single mode optical fiber.

In FIG. 2, the relationship between core diameter and mode field diameter for conventional quartz single mode optical fiber suitable for transmitting optical signals at a wavelength of 1.3 μm is graphically illustrated. In the graph, a series of approximately parallel curves are shown, each of which represents a fiber having a different value for the refractive index difference between the clad and the core. As can be seen in the graph, a curve has a respective minimum value for the mode field diameter corresponding with a particular value for the diameter of the fiber core. The line 1B in the drawing interconnects the minimum values of the respective curves. The above mentioned refractive index difference (RRID) is calculated by Equ. 1 below in which $m_1$ represents the refractive index for the core material and $m_2$ represents the refractive index for the core material.

$$RRID = \frac{m_1 - m_2}{m_1} \quad \text{Equ. 1}$$

In FIG. 2, the region 1A relates to a range for the structural parameters characteristic of the conventional quartz single mode optical fiber, the structural parameters being as follows: core diameter 9–10 μm, refractive index difference 0.28–0.35%, external diameter of cladding 125 μm. As shown in the graph, the region 1A corresponds to a relatively low mode field diameter, and thus indicates a parameter range not very suitable for the fully formed optical fiber coupler. Further, this region 1A is significantly to the right of the above mentioned line 1B which coincides with minimum values of mode field diameter for various examples of the optical fiber. Thus, if starting material corresponding with the region 1A were to be used for the single mode optical fiber 13 used to form the optical fiber coupler of the present invention, a considerable amount of drawing of the fused fibers would be required to obtain a coupler in which the single mode optical fiber 13 possesses a suitably large mode field diameter, which would accordingly result in an excessively long optical fiber coupler. Thus it can be seen that for the single mode optical fiber 13, it is preferable to use quartz single mode optical fiber of which the structural parameters correspond with a point somewhere to the left of the line 1B in FIG. 2.

Because in the optical fiber coupler 11 of the present embodiment, one of the two fibers which are fused together to form the coupler is a single mode optical fiber 13 characterized by having a parameter range in which the mode field diameter increases monotonically with decrease in the diameter of the optical fiber core, the amount of drawing out of the fused component fibers can be limited to a relatively small amount while still achieving adequate optical coupling. For this reason, it is possible to fabricate a small sized optical fiber coupler 11.

In the optical fiber coupler 11 of this first preferred embodiment as described, only one conventional fiber 12 and one single mode optical fiber 13 each were employed. However, it is also possible to incorporate a plurality of the conventional fibers 12 and/or a plurality of the single mode optical fibers 13 in the manufacture of such an optical fiber coupler 11. The coupler may also be manufactured using only two or more of the single mode optical fibers 13.

First Experimental Example

Using a quartz optical fiber suitable for transmitting light signals at a wavelength of 1.3 μm having a core diameter of 5 μm, an external cladding diameter of 125 μm, and a refractive index difference of 0.3% for the conventional fiber 12, and a single mode quartz optical fiber having a core diameter of 9 μm, an external cladding diameter of 125 μm, and a refractive index difference of 0.3%, for the single mode optical fiber 13, a portion of each were aligned side by side and thermally fused. The fused portion was then draw out to produce an optical fiber coupler 11 of the same type as that of the first preferred embodiment as shown in FIG. 1. The fused-elongated region 14 thus manufactured had a minimum outer diameter of 45 μm, and a length of 7 mm. The measured value for loss from the thus produced optical fiber coupler 11 was 0.1 dB which is extremely low.

Second Preferred Embodiment

In the following section, the second preferred embodiment of the present invention will be described with reference to FIG. 3.

Figure 3:
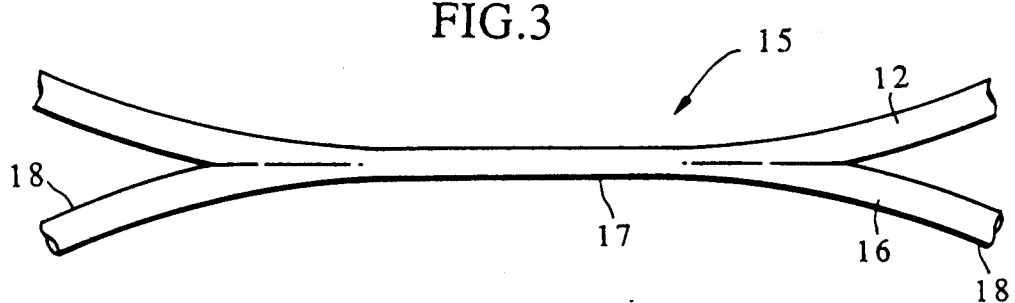
FIG. 3 is a side view of the optical fiber coupler of the second preferred embodiment of the present invention.

The optical fiber coupler 15 of the present embodiment as shown in FIG. 3 consists of a fused-elongated region 17 formed by thermally fusing and then drawing out a section of each of two component optical fibers 12 and 16, one of which is the previously described conventional fiber 12, and one of which is a single mode optical fiber 16 characterized by having negligible wavelength dispersion and being a dispersion shifted optical fiber at wavelengths of 1.4 μm and greater (hereafter referred to as dispersion shifted fiber 16).

For the above mentioned dispersion shifted fiber 16, the bending loss characteristics are extremely good, and the refractive index difference (Δ %) is comparatively high. Additionally, the core diameter is such that the structural parameters lie in the region to the left of the line 1B in FIG. 2.

In general, it cannot be said that bending loss characteristics are always good with optical fiber having a comparatively low refractive index difference. In order to improve the bending loss characteristics, it is desirable to use optical fiber material for which the refractive index difference is high, and for which the core diameter is such that the structural parameters lie in the region to the left of the line 1B in FIG. 2. With such optical fiber material, because change in the mode field diameter is sensitive to variation in the core diameter or regulated variation of the light frequency, the so called wave guide dispersion is high.

Figure 4:
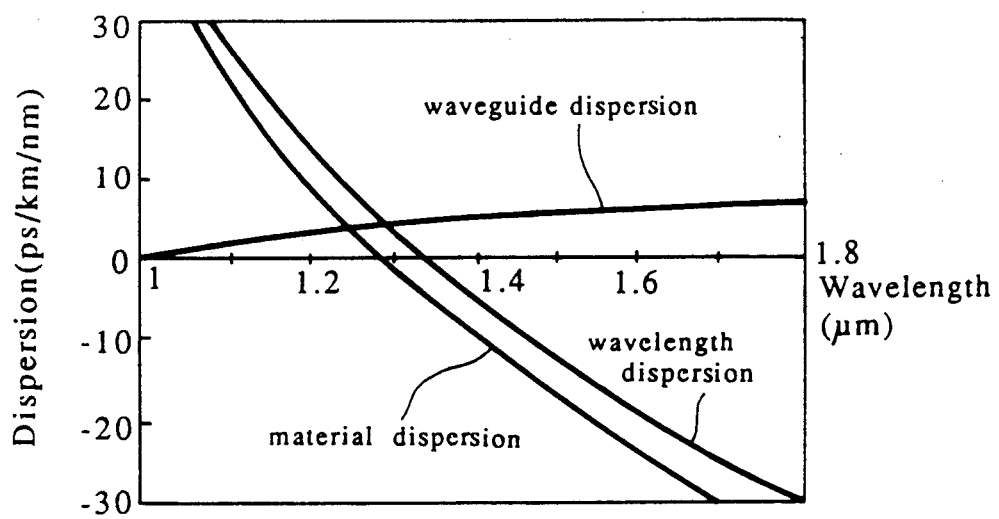
FIGS. 4 and 5 are graphs illustrating the relationship between wavelength and dispersion for the optical fibers.
Figure 5:
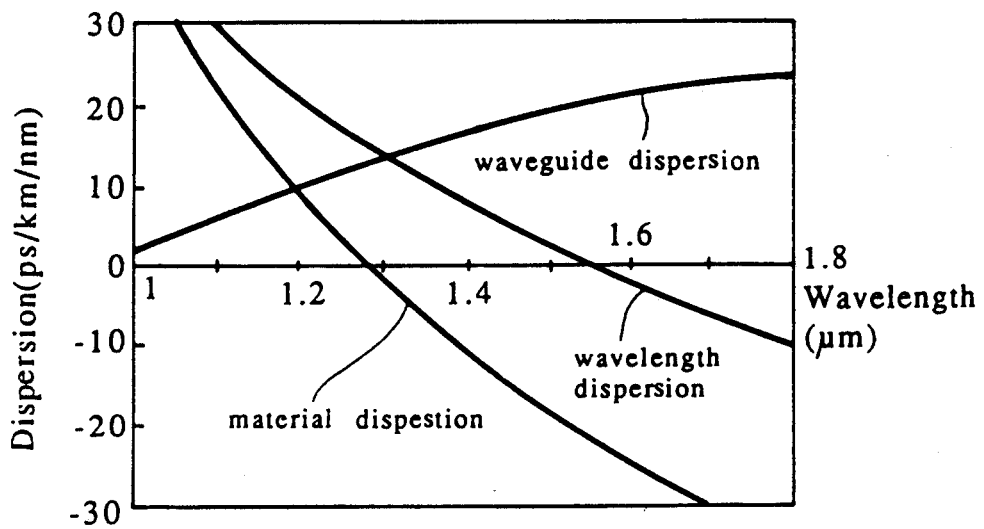

In FIGS. 4 and 5, examples of the wavelength dispersion characteristics can be seen for conventional optical fiber suitable for transmitting light signals at a wavelength of 1.3 μm of which the refractive index difference is high and of which the core diameter is small. For the optical fiber material represented in FIG. 4, the wave guide dispersion is low, and in the vicinity of 1.3 μm, the wavelength dispersion representing the sum of the wave guide dispersion and materials dispersion is zero. Concerning the above mentioned wave guide dispersion, because the measured value varies with respect to the wavelength of the propagated light, the mode propagation state also varies. Similarly, concerning the above mentioned materials dispersion, because the refractive index difference for the optical fiber material varies with the wavelength of the propagated light, the mode propagation velocity also varies.

In the case of FIG. 5, the optical fiber material again has a refractive index difference which is high and a small core diameter. However, for the material represented by FIG. 5, the wave guide dispersion is high. Due to the high wave guide dispersion, the wavelength dispersion is shifted towards longer wavelengths. The above mentioned dispersion shifted fiber 16 is an example of an optical fiber material for which the wave guide dispersion has been intentionally shifted to a higher value in this way. For this kind of dispersion shifted fiber 16, the wavelength at which the wavelength dispersion value becomes zero is shifted to a wavelength longer than 1.3 μm, and is generally in the range of 1.4–1.6 μm. When the wavelength at which the wavelength dispersion value becomes zero is shorter than 1.4 μm, an optical fiber having sufficiently stable characteristics in response to bending is not obtainable. Thus when used to form an optical fiber coupler, there is increased chance for optical losses in the portions of the optical fiber leading up to the optical fiber coupler.

With the optical fiber coupler 15 of the present preferred embodiment, by choosing optical fiber materials having selected values for the refractive index difference for the two component optical fibers, conventional fiber 12, and dispersion shifted fiber 16, the propagation constant of the respective component optical fibers 12, 16 can be varied to match desired values. By selecting desired propagation constant for the two component fibers 12, 16 which are different and then thermally fusing together a portion of each component optical fiber 12, 16 and drawing out the fused portion as described above to form the fused-elongated region 17, the wavelength dependance characteristics of the resulting optical fiber coupler 15 can be controlled. By this means, an optical fiber coupler which is largely wavelength independent (or wide band-pass type optical fiber coupler) can be fabricated.

Further, by using a dispersion shifted fiber 16 having superior stability characteristics in response to fiber bending, the resulting optical fiber coupler 15 includes lead fibers 18 leading up to the fused-elongated region 17 for which the stability characteristics in response to fiber bending are supported.

Second Experimental Example

Using a quartz optical fiber suitable for transmitting light signals at a wavelength of 1.3 μm having a core diameter of 9 μm, an external cladding diameter of 125 μm, and a refractive index difference of 0.3% for the conventional fiber 12, and an optical fiber having a core diameter of 4 μm, an external cladding diameter of 125 μm, a refractive index difference of 0.7%, and a zero wavelength dispersion value at 1.55 μm for the dispersion shifted fiber 16, a portion of each were aligned side by side and thermally fused. The fused portion was then draw out to produce an optical fiber coupler 15 of the same type as that of the second preferred embodiment as shown in FIG. 3. The fused-elongated region 17 thus manufactured had a minimum outer diameter of 55 μm, and a length of 6 mm. The measured value for loss from the thus produced optical fiber coupler 15 was 0.05 dB which is extremely low. Further, when the lead fiber 18 of the optical fiber coupler 15 manufactured as described above was bent in the form of a curve having a bending curvature of 10 mm, the additional optical loss was only 0.1 dB. Using a prior art coupler suitable for light signals at a wavelength of 1.3 μm, bending a lead under the same conditions demonstrated an additional loss of 0.5 dB.

Examining the wavelength dependance characteristics of the optical fiber coupler 15 manufactured as described above, it was found that the optical fiber coupler 15 was minimally wavelength dependant and could be used over a wide range of wavelengths as a wavelength independent optical fiber coupler (wide band-width type optical fiber coupler).

Third Preferred Embodiment

Figure 6:
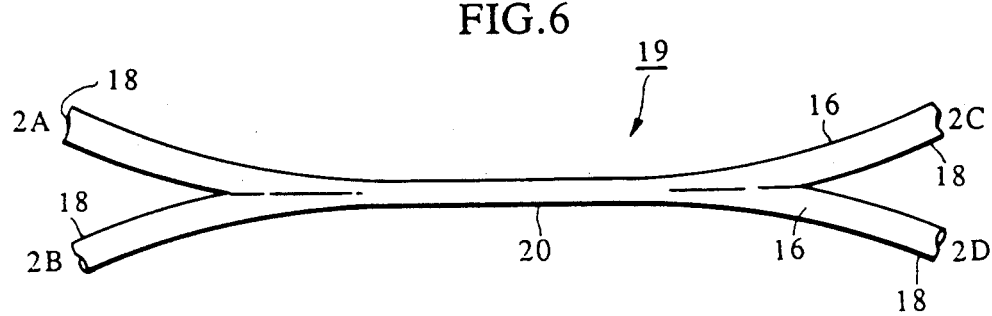
FIG. 6 is a side view of the optical fiber coupler of the third preferred embodiment of the present invention.
Figure 7:
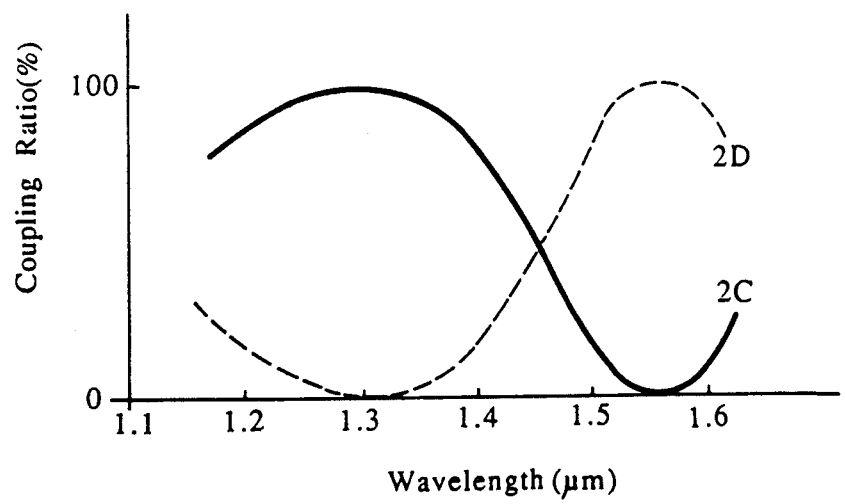
FIG. 7 is a graph illustrating one example of the relationship between wavelength and coupling ratio for the optical fiber coupler shown in FIG. 6.

In the following section, the third preferred embodiment of the present invention will be described with reference to FIG. 6.

The optical fiber coupler 19 of the present embodiment as shown in FIG. 3 consists of a fused-elongated region 20 formed by thermally fusing and then drawing out a section of each of two component optical fibers, both of which are the same as the dispersion shifted fiber 16 employed in the optical fiber coupler 15 described above for the second preferred embodiment of the present invention.

With the optical fiber coupler 19 of the present embodiment, by appropriately controlling the elongation ratio of the fused-elongated region 20, it is possible to fabricate a selective wavelength splitter type optical fiber coupler in which at certain wavelengths, essentially no light is transmitted and at certain other wavelengths, essentially 100 % transmission is achieved.

By constructing the optical fiber coupler 19 using two of the dispersion shifted fibers 16, of which only one is employed in the optical fiber coupler 15 described above for the second preferred embodiment, an optical fiber coupler 19 with even greater stability characteristics in response to bending can be fabricated.

Third Experimental Example

Using two dispersion shifted optical fibers 16, each having a zero wavelength dispersion value at 1.55 μm, a portion of each were aligned side by side and thermally fused. The fused portion was then draw out to produce an optical fiber coupler 19 of the same type as that of the third preferred embodiment as shown in FIG. 6. The fused-elongated region 20 thus manufactured had a minimum outer diameter of 55 μm, and a length of 10 mm.

Measuring the optical coupling wavelength characteristics of the optical fiber coupler 19 of the present experimental example, it was found that the optical fiber coupler 19 could be used as a selective wavelength splitter type optical fiber coupler. That is to say, of the four ports 2A, 2B, 2C, 2D, when an optical signal containing two wavelength components, one at 1.3 μm and one at 1.55 μm, was input at port 2A, it was found that the optical signal was separated into its two components, one emitted from port 2C and one emitted from port 2D.

Fourth Preferred Embodiment

In the following section, the fourth preferred embodiment of the present invention will be described with reference to FIG. 8.

Figure 8:
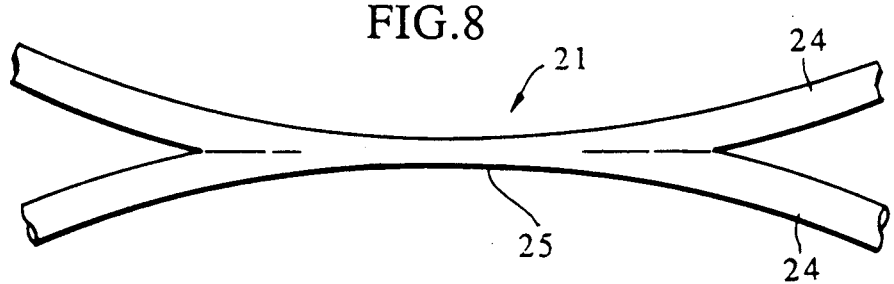
FIG. 8 is a side view of the optical fiber coupler of the fourth preferred embodiment of the present invention.

The optical fiber coupler 21 of the present embodiment as shown in FIG. 8 consists of a fused-elongated region 25 formed by thermally fusing the cladding from a section of each of two component optical fibers 24 and then drawing out the fused section, both of the optical fibers 24 being such that the softening temperature of the core 23 is higher than that of the cladding 22. For the drawing out of the mutually fused sections, the tension employed is such that by virtue of remaining stress, the refractive index of the cores of the fused sections is reduced.

For the optical fibers 24 of the present embodiment, a suitable example is optical fiber material having a core 23 of essentially pure quartz ($SiO_2$) and a cladding 22 containing added fluorine to thereby cause the cladding to have a lower refractive index than the core. With this kind of optical fiber 24, at high temperatures the viscosity coefficient of the core 23 and that of the cladding 22 differ by an order of magnitude (the viscosity coefficient of the core 23 is higher). Because the viscosity coefficient of the cladding 22 is lower, by appropriately choosing the temperature used during elongation of the fused sections so that only the cladding 22 is in a moldable state, is possible to impose a degree of elastic strain only in the core 23 which is controllable by the amount of tension applied during elongation. By virtue of the elastic strain imposed on the core 23, due to the strain dependant optical properties of the core material, the refractive index of the core 23 is decreased, while that of the cladding 22 is not effected.

Figure 9:
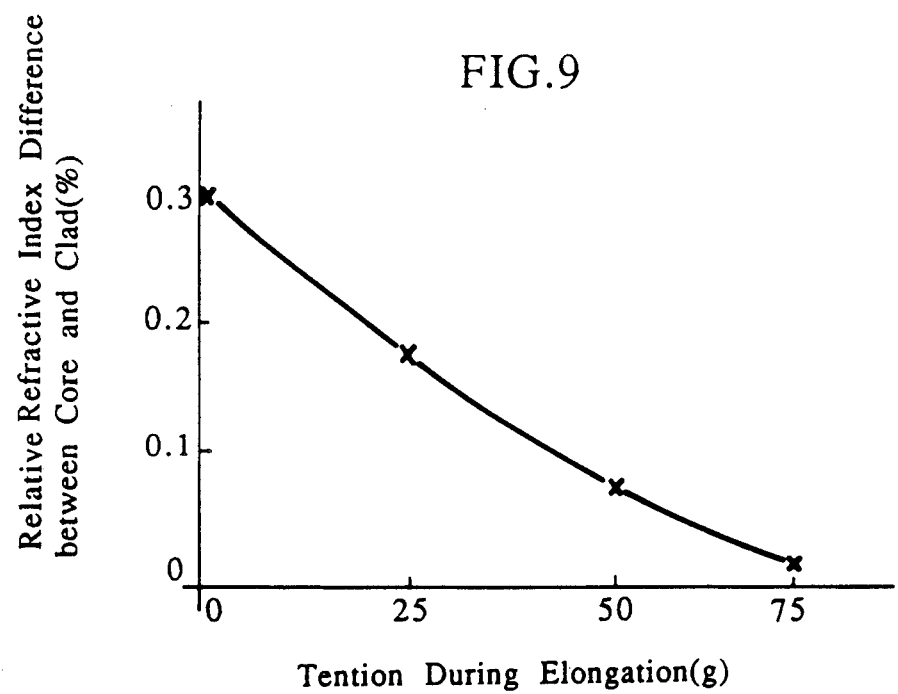
FIG. 9 is a graph illustrating the relationship between the relative difference of the refractive index for the core and that for the cladding and the tension applied during elongation for the optical fiber employed in the optical fiber coupler shown in FIG. 8.

In FIG. 9, a graph is shown which demonstrates the relationship between the amount of tension applied during elongation of the heated optical fiber 24 and the lowering of the refractive index difference by decreasing the refractive index of the core material. For the graph of FIG. 9, an optical fiber material was used having a core diameter of 11 μm and a cladding outer diameter of 125 μm. As is clear from FIG. 9, as the amount of tension applied during elongation of the optical fiber 24 is increased, the refractive index difference between the core and cladding decreases.

Figure 10:
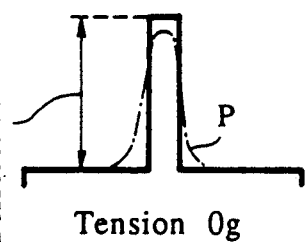
FIGS. 10 through 12 are views of key points in the graph of FIG. 9 in which the relationship between the relative difference of the refractive index for the core and that for the cladding and the tension applied during elongation is expressed in terms of the distribution of refractive index for the optical fiber.
Figure 11:
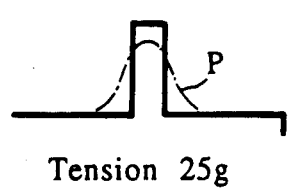
Figure 12:
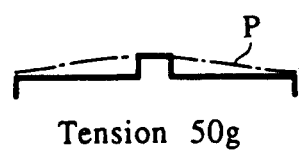

In FIGS. 10 through 12, the refractive index distribution is shown for the optical fiber 24. As shown in these drawings, for the single mode optical fiber 24, as the refractive index of the core (the upward projecting central portion of each drawing) decreases, and hence the refractive index difference for the optical fiber 24, the power distribution (P) of the propagation mode becomes wider and shorter, and is essentially shifted peripherally. Thus, by virtue of the effect of elongation on the refractive index difference and hence on the power distribution of the propagation mode with the optical fiber 24 of the present embodiment, a suitably wide mode diameter and hence good optical coupling can be achieved, which in the case of the optical fibers employed in prior art optical fiber couplers, would have required considerably more elongation and reduction in the core diameter.

Figure 13:
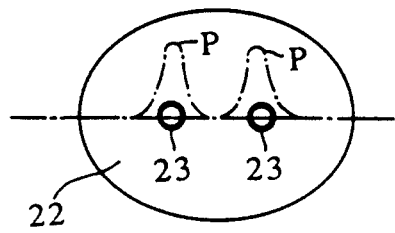
FIGS. 13 and 14 are illustrations of the power distribution in a fused section and a fused-elongated section respectively in an optical fiber coupler.
Figure 14:
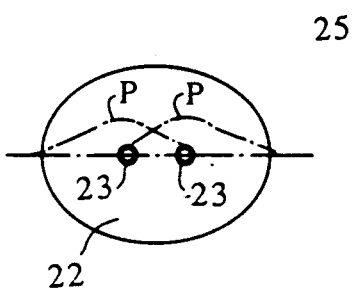

In FIGS. 13 and 14, the power distribution for the fused-elongated region 25 of the optical fiber coupler 21 of the present embodiment is schematically illustrated. FIG. 13 is the power distribution for the fused optical fibers 24 prior to elongation and FIG. 14 is the power distribution for the fused-elongated optical fibers 24 which constitute the fused-elongated region 25 of the optical fiber coupler 21. As is clear from FIG. 13, there is no overlapping of the power distributions of the two component optical fibers 24 and hence no optical coupling can occur. In the case of the fused, and furthermore elongated optical fibers 24 shown in FIG. 14, there is good overlap of the power distributions emanating from the somewhat narrowed cores 23 in the fused-elongated region 25 so that the optical signal of one of the component optical fibers 24 can seep into and hence couple with the adjacent optical fiber.

As described above, in the optical fiber coupler 21 of the present embodiment, adequate optical coupling can be achieved without extreme elongation of the component optical fibers 24, and hence extreme reduction in the diameters of their cores. Accordingly, the mechanical strength of the optical fiber coupler 21 can be improved. Further, optical losses caused by bending of the optical fiber coupler 21 can be lessened.

Fourth Experimental Example

Using two optical fibers 24, each having a core diameter of 10 μm, a cladding external diameter of 125 μm, a refractive index difference prior to elongation of 0.3%, a core of pure quartz, and a cladding incorporating added fluorine, a 100 μm portion of each were aligned side by side and thermally fused using a sufficiently high temperature so as to form a roughly cylindrical fused portion which was then drawn out to produce a fused region having a diameter of approximately 125 μm.

Next, the fused region formed as described above was heated to a relatively low temperature on the order of 1300° C and drawn out at a pulling tension of 50 g, whereby the diameter of the fused section was reduced by about 10%. Finally, while the above described pulling tension was maintained, the heating temperature was rapidly lowered to thereby produce an optical fiber coupler 21 the same as that of the fourth preferred embodiment as shown in FIG. 8. By means of the above described procedure, a suitable degree of optical coupling between the two component optical fibers 24 can be achieved. The optical fiber coupler 21 thereby obtained had a mechanical strength close to that of the component optical fibers 24. Furthermore, optical losses for the obtained optical fiber coupler 24 were low at about 0.2 dB.

In the present experimental example, the length of the section of initially fused optical fibers 24 was 100 μm, however, this length can be up to 1 to 2 mm for the same type of optical fiber coupler 21. As an example, an optical fiber coupler 21 was fabricated in which the length of the section of initially fused optical fibers 24 was 1 mm with all other conditions being the same. The optical fiber coupler 21 thereby produced demonstrated optical losses of 0.3 dB.

Fifth Preferred Embodiment

In the following section, the fifth preferred embodiment of the present invention will be described with reference to FIG. 15.

Figure 15:
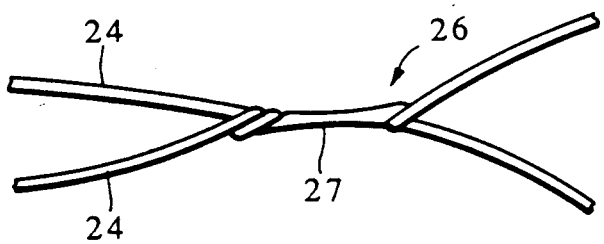
FIG. 15 is a side view of the optical fiber coupler of the fifth preferred embodiment of the present invention.

The optical fiber coupler 26 of the present embodiment as shown in FIG. 15 consists of a twisted fused-elongated region 27 formed by thermally fusing the cladding from a section of each of two component optical fibers 24 identical to those of the above fourth preferred embodiment and then drawing out the fused section while twisting the pair of optical fibers 24. For the drawing out and twisting of the mutually fused sections, the tension employed is such that by virtue of remaining stress, the refractive index of the cores of the fused sections is reduced.

With the optical fiber coupler 26 of the present embodiment, as was the case with the optical fiber coupler 21 of the fourth preferred embodiment shown in FIG. 8, essentially by decreasing the refractive index difference between the core and cladding and thereby broadening the mode power distribution, suitable optical coupling between the fused sections of optical fiber 24 can be achieved. Accordingly, without extremely reducing the diameter of the fused-elongated region 27, adequate optical coupling is possible. Thus, the mechanical strength of the optical fiber coupler 26 can be improved. Further, optical losses caused by bending of the optical fiber coupler 26 can be lessened.

Fifth Experimental Example

Using two optical fibers 24, each having a core diameter of 10 μm, a cladding external diameter of 125 μm, a refractive index difference prior to elongation of 0.3%, a core of pure quartz, and a cladding incorporating added fluorine, a 100 μm portion of each were aligned side by side and thermally fused using a sufficiently high temperature so as to form a roughly cylindrical fused portion which was then drawn out while twisting three full turns to produce a fused region having a diameter of approximately 80 μm.

Next, the fused region formed as described above was heated to a relatively low temperature on the order of 1300° C and drawn out at a tension of 50 g, whereby the diameter of the fused section was reduced by about 10%. Finally, while the above described pulling tension was maintained, the heating temperature was rapidly lowered to thereby produce an optical fiber coupler 26 the same as that of the fifth preferred embodiment as shown in FIG. 15. By means of the above described procedure, a suitable degree of optical coupling between the two component optical fibers 24 can be achieved. The optical fiber coupler 26 thereby obtained had a mechanical strength close to that of the component optical fibers 24. Furthermore, insertion losses for the obtained optical fiber coupler 24 were low at about 0.2 dB.

In the present experimental example, the length of the section of initially fused optical fibers 24 was 100 μm, however, this length can be up to 1 to 2 mm for the same type of optical fiber coupler 26. As an example, an optical fiber coupler 26 was fabricated in which the length of the section of initially fused optical fibers 24 was 1 mm with all other conditions being the same. The optical fiber coupler 26 thereby produced demonstrated insertion losses of 0.3 dB.

Sixth Preferred Embodiment

In the following section, the sixth preferred embodiment of the present invention will be described with reference to FIG. 16.

Figure 16:
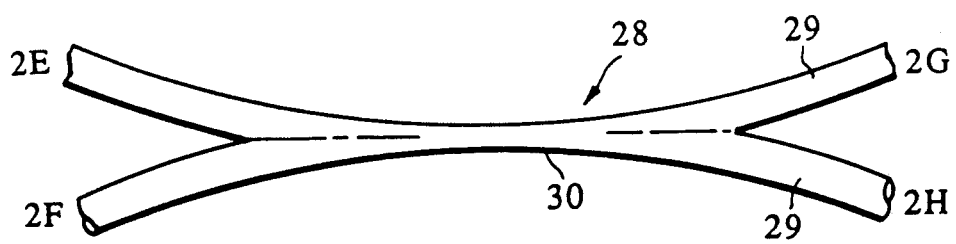
FIG. 16 is a side view of the optical fiber coupler of the sixth preferred embodiment of the present invention.

The optical fiber coupler 28 of the present embodiment as shown in FIG. 16 consists of a fused-elongated region 30 formed by thermally fusing the clad from a section of each of two component optical fibers 29 having a quartz glass core of which the refractive index was reduced 0.1% or less by the addition of fluorine, and a quartz glass cladding of which the refractive index was adjusted to a level lower than that of the core by the addition of fluorine, and then drawing out the fused section. For the drawing out of the mutually fused sections, the tension employed is such that by virtue of remaining stress, the refractive index of the cores of the fused sections is reduced. The reason for using a glass fiber for which the refractive index of the core is reduced 0.1% or less as described above is to facilitate the formation of an optical fiber coupler 28 having a suitable refractive index difference between the core and clad.

Because the component optical fibers 29 employed in the present preferred embodiment can have a core-clad refractive index difference even lower than that of the component optical fibers 24 employed in the fourth and fifth preferred embodiments, effective optical coupling between the fused sections of optical fiber 29 can be achieved with even less elongation and hence diameter reduction. Accordingly, the mechanical strength of the optical fiber coupler 28 can be further improved and insertion losses caused by bending of the optical fiber coupler 28 can be further lessened.

Sixth Experimental Example

Using two optical fibers 29, each having a core diameter of 10 μm, a cladding external diameter of 125 μm, a refractive index difference prior to elongation of 0.32%, a core of quartz incorporating added fluorine (sufficient fluorine is added so that the refractive index of the core is reduced 0.05%), and a quartz clad incorporating added fluorine, 100 μm portions from each of the component optical fibers 29 were aligned side by side and thermally fused using a sufficiently high temperature so as to form a roughly cylindrical fused portion which was then drawn out produce a fused region having a diameter of approximately 125 μm.

Next, the fused region formed as described above was heated to a relatively low temperature on the order of 1300° C and drawn out at a pulling tension of 50 g, whereby the diameter of the fused section was reduced by about 10%. Finally, while the above described pulling tension was maintained, the heating temperature was rapidly lowered to thereby produce an optical fiber coupler 28 the same as that of the sixth preferred embodiment as shown in FIG. 16. By means of the above described procedure, a suitable degree of optical coupling between the two component optical fibers 29 can be achieved. The degree of optical coupling for the optical fiber coupler 28 thereby obtained was then measured and it was found that 51% optical coupling was obtained between port 2E and port 2G shown in FIG. 16, 49% between port 2E and port 2H, 49% optical coupling was obtained between port 2F and port 2G, and 51% optical coupling was obtained between port 2F and port 2H. Furthermore, optical losses for the obtained optical fiber coupler 28 were low at about 0.2 dB.

In the present experimental example, the length of the section of initially fused optical fibers 29 was 100 μm, however, this length can be up to 1 to 2 mm for the same type of optical fiber coupler 28. As an example, an optical fiber coupler 28 was fabricated in which the length of the section of initially fused optical fibers 29 was 1 mm with all other conditions being the same. The optical fiber coupler 28 thereby produced demonstrated losses of 0.3 dB.

Seventh Preferred Embodiment

In the following section, the seventh preferred embodiment of the present invention will be described with reference to FIG. 17.

Figure 17:
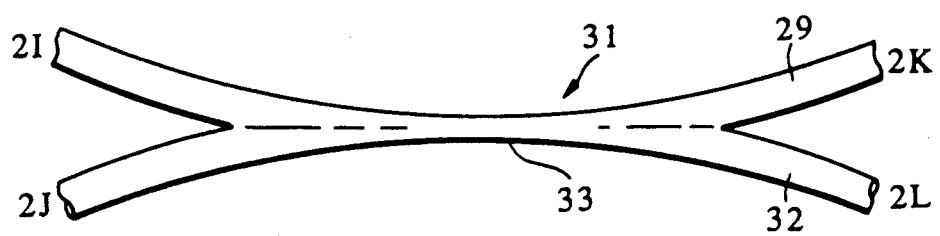
FIG. 17 is a side view of the optical fiber coupler of the seventh preferred embodiment of the present invention.

The optical fiber coupler 31 of the present embodiment as shown in FIG. 17 consists of a fused-elongated region 33 formed by lining up and thermally fusing the cladding from a section of each of two component optical fibers, an optical fiber 29 identical to that employed in the above sixth preferred embodiment, and an optical fiber 32 having a core of a lesser diameter than that of the optical fiber 29, and then drawing out the fused section. For the drawing out of the mutually fused sections, the tension employed is such that by virtue of remaining stress, the refractive index of the cores of the fused sections is reduced.

Figure 18:
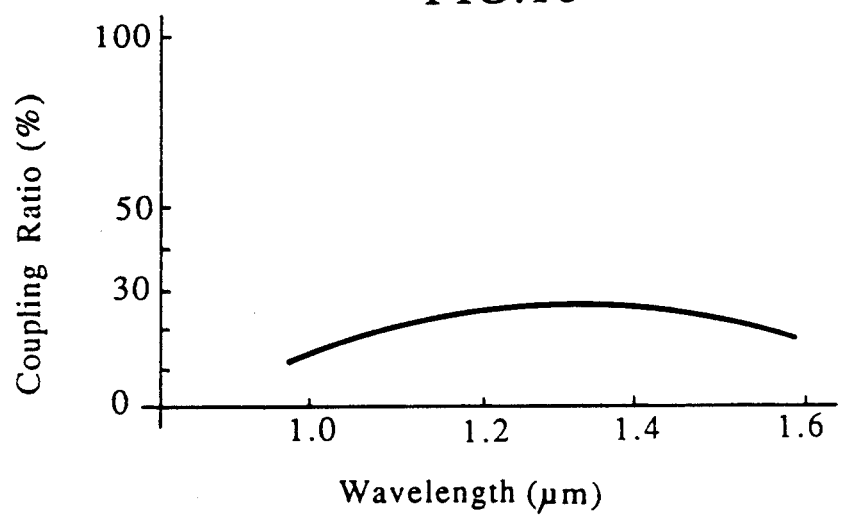
FIGS. 18 and 19 are diagrams illustrating the dependance of degree of optical coupling on wavelength for the optical fiber couplers shown in FIGS. 15 and 16.

For the optical fiber coupler 31 of the present embodiment, the phase constant is different for each of the component optical fibers 29, 32. For this reason, optical coupling in the optical fiber coupler 31 is largely wavelength independent, as demonstrated by the fairly flat curve in FIG. 18 which shows the degree of optical coupling between port 2I and 2L as a function of wavelength of the light for the optical fiber coupler 31 shown in FIG. 17.

Figure 19:
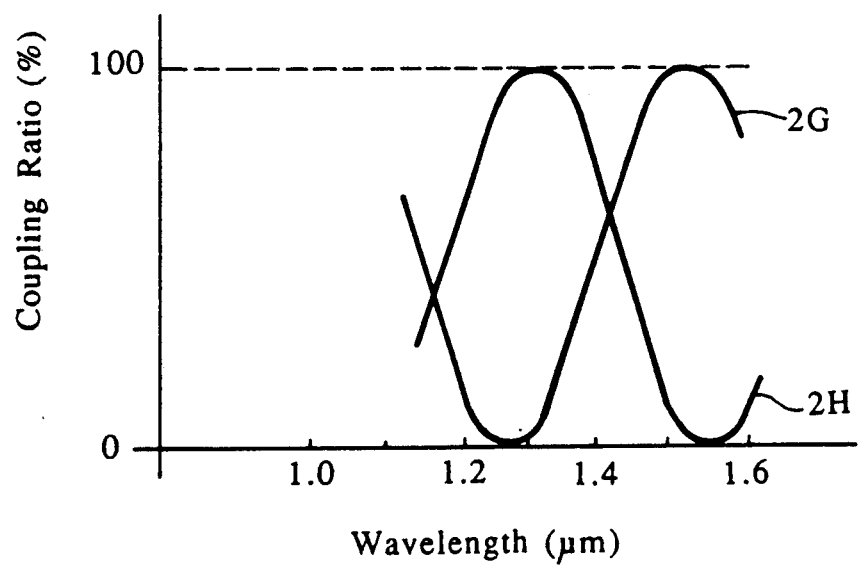

In contrast, for the case of the previously described optical fiber couplers 21, 26 and 28, shown in FIGS. 8, 15 and 16 respectively, which are fabricated from two identical optical fibers, the coupling ratio differs with changing wavelength of the transmitted light, with virtually 100% coupling occurring at certain specific wavelengths of the transmitted light. As shown in FIG. 19, when an optical signal containing two wavelength components, was input at port 2E of the optical fiber coupler 28 shown in FIG. 16, it was found that the optical signal was separated into its two components, one emitted from port 2G and one emitted from port 2H. Thus, in distinction to the optical fiber coupler 31 of the present embodiment, those optical fiber couplers employing two identical optical fibers can be used as a selective wavelength splitter type optical fiber coupler.

In the optical fiber coupler 31 of the present preferred embodiment, because the phase constant is different for each of the component optical fibers 29, 32, optical coupling in the optical fiber coupler 31 is largely wavelength independent. Accordingly, the optical fiber coupler 31 can be used over a wide range of wavelengths as a wavelength independent optical fiber coupler (wide band-pass type optical fiber coupler).

Seventh Experimental Example

Using an optical fibers 29 having a core diameter of 10 μm, a cladding external diameter of 125 μm, a refractive index difference prior to elongation of 0.32%, a core of quartz incorporating added fluorine, and a quartz cladding incorporating added fluorine, and an optical fiber 32 having a core diameter of 9 μm, a cladding external diameter of 125 μm, a refractive index difference prior to elongation of 0.32%, a core of quartz incorporating added fluorine, and a quartz cladding incorporating added fluorine, 100 μm portions from each of the component optical fibers 29 were aligned side by side and thermally fused using a sufficiently high temperature so as to form a roughly cylindrical fused portion which was then drawn out produce a fused region having a diameter of approximately 125 μm.

Next, the fused region formed as described above was heated to a relatively low temperature on the order of 1300° C and drawn out at a tension of 50 g, whereby the diameter of the fused section was reduced by about 10%. Finally, while the above described pulling tension was maintained, the heating temperature was rapidly lowered to thereby produce an optical fiber coupler 31 the same as that of the seventh preferred embodiment as shown in FIG. 17.

In the present experimental example, the length of the section of initially fused optical fibers 29, 32 was 100 μm, however, this length can be up to 1 to 2 mm for the same type of optical fiber coupler 31. As an example, an optical fiber coupler 31 was fabricated in which the length of the section of initially fused optical fibers 29 was 1 mm with all other conditions being the same. The optical fiber coupler 31 thereby produced demonstrated optical losses of 0.3 dB.

The various examples of the present invention presented in the above preferred embodiments are merely examples and are in no way to be construed as limiting the present invention. It is possible, for example, to employ three or more optical fibers in the optical fiber coupler of the present invention with acceptable results. It should be understood that the optical fiber coupler of the present invention includes all forms encompassed by the appended claims.

What is claimed is:

1. An optical fiber coupler formed by fusing a section of each of two or more component optical fibers, and then elongating the fused section to form a fused-elongated region in which at least one of said component optical fibers is a single mode optical fiber having a parameter range such that as the diameter of the core of said optical fiber is reduced, the diameter of the mode field for said optical fiber increases monotonically.

2. An optical fiber coupler in accordance with claim 1 above in which said single mode optical fiber is a dispersion shifted single mode fiber for which the wavelength value at which wavelength dispersion becomes zero is 1.4 μm or greater.

3. An optical fiber coupler in accordance with claim 1 above in which said two or more component optical fibers are dispersion shifted single mode fibers for which the wavelength value at which wavelength dispersion becomes zero is 1.4 μm or greater.

4. An optical fiber coupling formed by aligning side by side a section of each of two or more component optical fibers from which the coating material has been removed from said section thereby exposing the cladding, and then elongating the fused section to form a fused-elongated region in which said component optical fibers are optical fibers of which the softening temperature of the core is higher than that of the cladding, and wherein during the step of elongating, employing tension such that the refractive index of the cores of said optical fibers is reduced by stress.

5. An optical fiber coupling in accordance with claim 4 above formed by aligning side by side a section of each of two or more component optical fibers from which the coating material has been removed from said section thereby exposing the cladding, and then elongating and twisting the fused section to form a twisted fused-elongated region in which said component optical fibers are optical fibers of which the softening temperature of the core is higher than that of the cladding, and wherein during the step of elongating and twisting, employing tension such that the refractive index of the cores of the optical fibers is reduced by stress.

6. An optical fiber coupler in accordance with either of claims 4 and 5 of which the cores of said two or more component optical fibers are dopant free quartz glass, and of which the claddings of said two or more component optical fibers are quartz glass of which the refractive index has been adjusted by the addition of at least one additive selected from the group including fluorine and boron.

7. An optical fiber coupler in accordance with either of claims 4 and 5 of which the cores of said two or more component optical fibers are quartz glass containing a dopant such that the refractive index has been altered by as much as 0.1%, and of which the claddings of said two or more component optical fibers are quartz glass of which the refractive index has been adjusted by the addition of at least one additive selected from the group including fluorine and boron.

8. An optical fiber coupler in accordance with either of claims 4 and 5 in which said two or more component optical fibers include optical fibers of at least two different diameters.

9. An optical fiber coupler in accordance with either of claims 4 and 5 of which the cores of said two or more component optical fibers are dopant free quartz glass, and of which the claddings of said two or more component optical fibers are quartz glass of which the refractive index has been adjusted by the addition of at least one additive selected from the group including fluorine and boron, and in which said two or more component optical fibers include optical fibers of at least two different diameters.

10. An optical fiber coupler in accordance with either of claims 4 and 5 of which the cores of said two or more component optical fibers are quartz glass containing a dopant such that the refractive index has been altered by as much as 0.1%, and of which the claddings of said two or more component optical fibers are quartz glass of which the refractive index has been adjusted by the addition of at least one additive selected from the group including fluorine and boron, and in which said two or more component optical fibers include optical fibers of at least two different diameters.

* * * * *